United States Patent [19]

McGookin

[11] Patent Number: 4,676,099
[45] Date of Patent: Jun. 30, 1987

[54] SUSPENDED-CABLE APPARATUS FOR MEASURING A PRESELECTED CONDITION OF MATERIAL IN A VESSEL

[75] Inventor: Hugh R. McGookin, Whittier, Calif.

[73] Assignee: Berwind Corporation, Philadelphia, Pa.

[21] Appl. No.: 776,655

[22] Filed: Sep. 16, 1985

[51] Int. Cl.$^4$ ............................................. G01F 23/20
[52] U.S. Cl. .................... 73/290 B; 248/317; 248/328
[58] Field of Search ...................... 73/290 B, 301, 313, 73/292; 248/317, 328

[56] References Cited

U.S. PATENT DOCUMENTS

| | | | |
|---|---|---|---|
| 182,089 | 9/1876 | Warner | 248/328 |
| 795,739 | 7/1905 | Stollar | 73/313 |
| 807,100 | 12/1905 | Wood | 248/328 |
| 1,444,542 | 2/1923 | Grossheim | 248/317 |
| 2,647,398 | 8/1953 | Marvel | 248/317 |
| 3,583,221 | 6/1971 | Ehrenfried | 73/301 |
| 4,276,774 | 7/1981 | McGookin | 73/290 B |
| 4,307,547 | 12/1981 | Kern | 248/317 |

Primary Examiner—Charles Frankfort
Assistant Examiner—Denis E. Corr
Attorney, Agent, or Firm—Barnes, Kisselle, Raisch, Choate, Whittemore & Hulbert

[57] ABSTRACT

Apparatus for indicating a preselected condition of material in a vessel which includes a laid wire cable vertically suspended within the vessel so as to contact and be surrounded by material contained therein. The laid wire cable is suspended by a roller-type thrust bearing which permits free rotation of the cable and thus prevents torsional sheer stresses on the suspended cable end due to tension in the cable and consequent unraveling and reraveling of the cable lays. In a preferred embodiment of the invention wherein the upper end of the cable is selectively slackened and material level is determined as a function of weight of the slackened cable end unsupported by material, a spherical head is affixed to the cable to seat against and cooperate with a side-thrust washer slidably carried on the foot of a load cell for isolating the load cell from lateral cable forces due to material or component tolerance variations. A slip ring assembly may be attached to the cable for providing direct electrical connection thereto.

11 Claims, 8 Drawing Figures

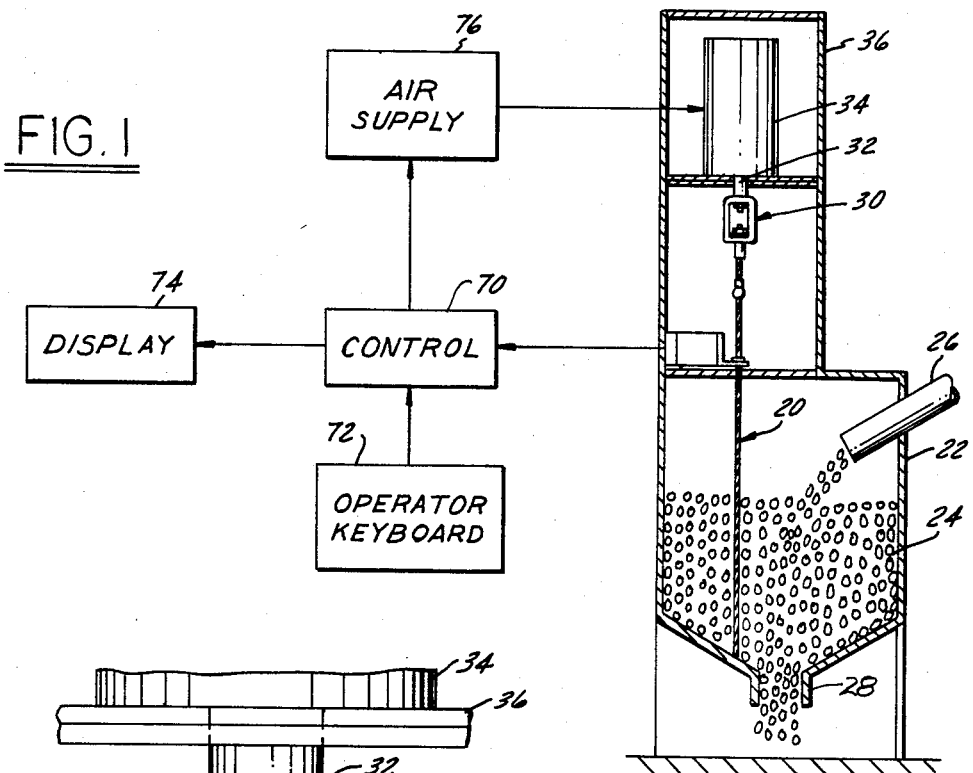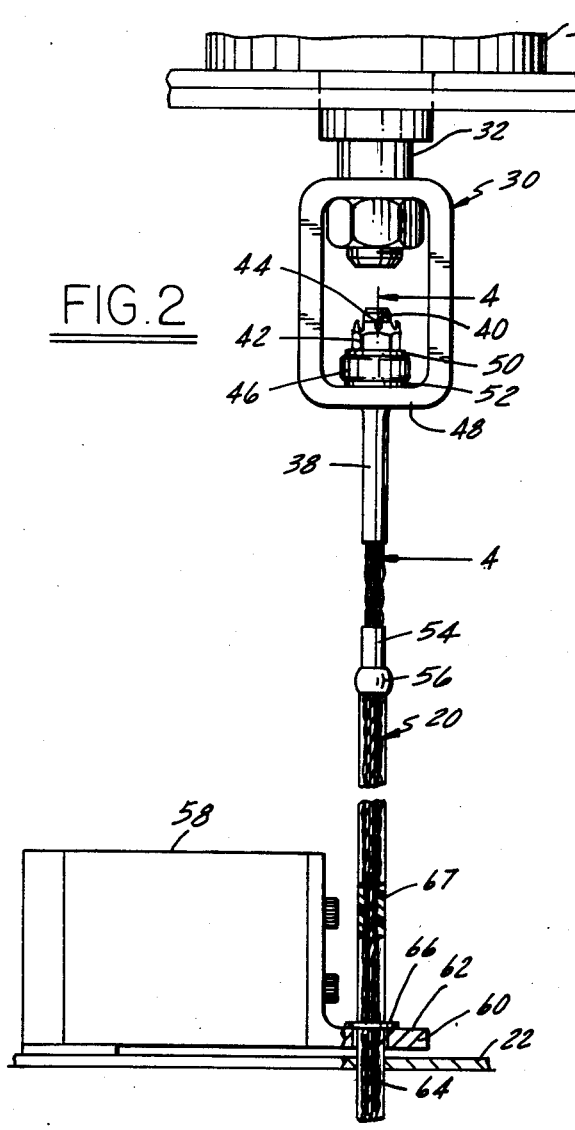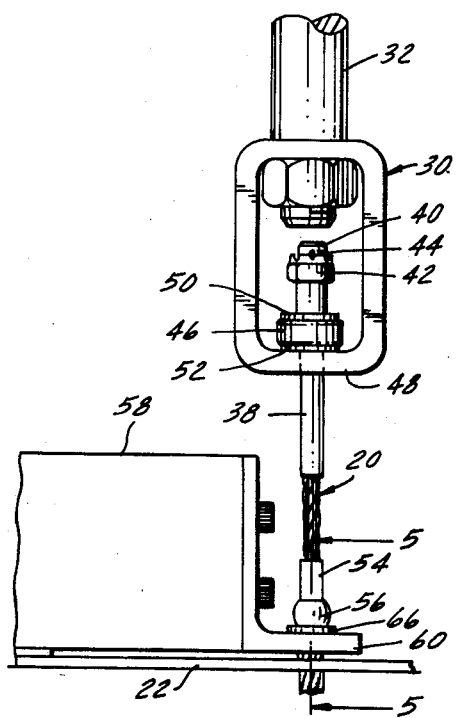

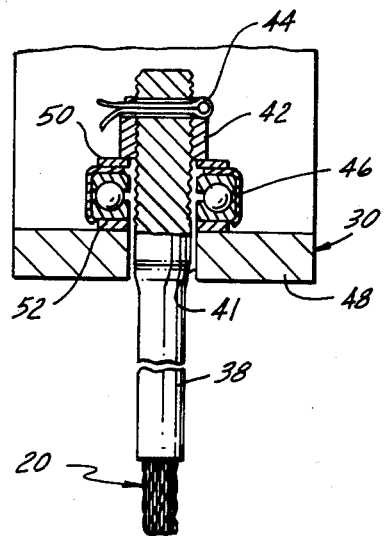
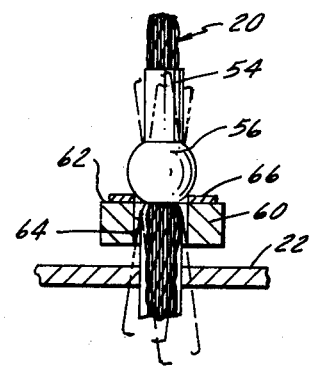
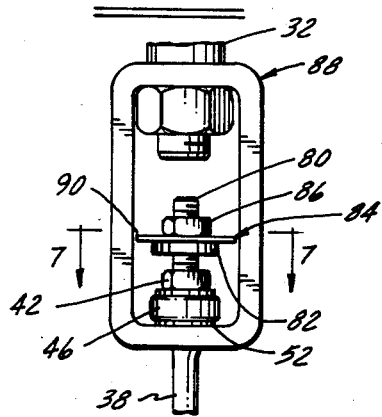
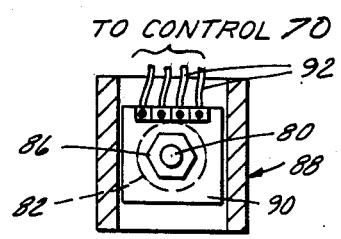
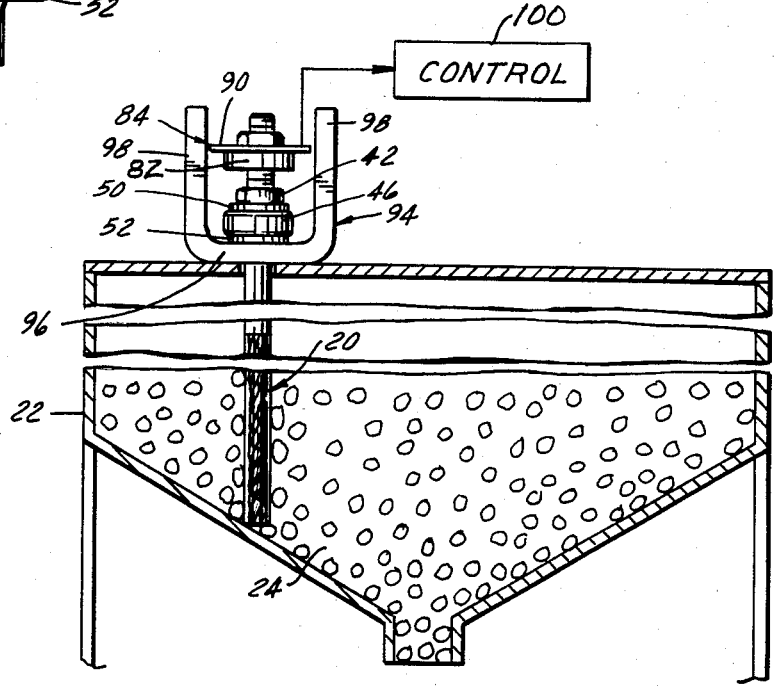

SUSPENDED-CABLE APPARATUS FOR MEASURING A PRESELECTED CONDITION OF MATERIAL IN A VESSEL

The present invention is directed to apparatus and systems for indicating a preselected condition of material contained in a vessel as a function of effect of such material on a cable suspended in the vessel, and more particularly to apparatus for indicating level of material contained in a vessel as a function of cable weight unsupported by the material.

U.S. Pat. No. 4,276,774 to the inventor herein discloses apparatus for measuring the level of flowable semisolid material wherein a cable is vertically suspended above and into the material such that the material surrounds and supports the lower portion of the cable. The upper portion of the cable is periodically or selectively slackened against a weighing device, such as a load cell, which provides a signal indicative of weight of the slackened portion of the cable unsupported by material, and thereby indicating level of material with respect to the cable length. In practice of the invention disclosed in such patent, it has been considered preferable to employ so-called "steel laid cable," also referred to as "laid cable" or "wire rope," as the measurement cable because of strength and flexibility of cables of this type. (Cables of this type are referred to as "laid wire cable" in the present application.) However, a problem is encountered in that tension on cables of this type tends to stretch and unravel the cable lays or strands. Substantial cable tension and lay unraveling is caused by material compaction when loaded from above, and by drag on the cable when unloaded from below. On the other hand, slackening of the cable or removal of all material relieves such tension and permits the cable lays to reravel to their normal position.

Such periodic raveling and unraveling in the presence of material permits material to become embedded in the cable lays, and also places high stress on the upper portion of the cable which is affixed to the slackening apparatus. Coating the cable with plastic or other low-friction material solves the material-embedment problem, but does not affect the problem of high torsional stresses at the cable support, which may lead to cable fracture and system failure. This problem is not limited to material level indicating systems responsive to cable weight, but applies equally as well to other material indicating systems which employ laid cable of the described type suspended in the material vessel. Such other systems include, for example, devices for measuring temperature of contained material as a function of cable temperature, or devices for indicating material level as a function of resistance or capacitance between the cable and the vessel wall.

Another problem which has arisen in application of the invention disclosed in the noted patent involves isolation of the weighing apparatus from side forces or loads on the cable, which do not contribute directly to cable weight and thus may lead to inaccuracies in the level measurement. In particular, when a load cell is employed as the weighing apparatus, it is important that the load cell be isolated from such side loads on the cable so as to be responsive solely to vertical weight of the slackened cable.

It is therefore an object of the present invention to provide a mechanism in suspended-cable apparatus of the described character for reducing or removing torsional stresses on the cable upper end caused by weight or drag of material surrounding the cable and consequent tension and unraveling in the cable. In furtherance of the foregoing, it is a more specific object of the invention to provide such a mechanism having application in suspended laid cable systems of various types and for indicating various conditions of the material.

Another object of the invention is to provide suspended-cable apparatus of the type disclosed in the noted patent for indicating level of material in a storage vessel or the like wherein side loads on the cable are isolated from the cable weighing mechanism.

The invention, together with additional objects, features and advantages thereof, will be best understood from the following description, the appended claims and the accompanying drawings in which:

FIG. 1 is a partially schematic and partially functional block diagram of suspended-cable apparatus for determining the level of material in a vessel in accordance with a presently preferred embodiment of the invention;

FIG. 2 is a fragmentary elevational view on an enlarged scale of a portion of the apparatus illustrated in FIG. 1;

FIG. 3 is a fragmentary elevational view on the scale of FIG. 2 illustrating the apparatus in operation;

FIGS. 4 and 5 are sectional views taken substantially along the lines 4—4 and 5—5 in FIGS. 2 and 3 respectively;

FIG. 6 is a fragmentary elevational view of a modified embodiment of the invention;

FIG. 7 is a sectional view taken substantially along the line 7—7 in FIG. 6; and FIG. 8 is a schematic illustration of another modified embodiment of the invention.

FIGS. 1-5 illustrate a presently preferred embodiment of the invention as comprising a laid wire cable 20 of stainless steel or other suitable stranded construction vertically suspended within a vessel 22 so as to contact and be surrounded by material 24 contained therein. Material 24 is typically of flowable pulverulent composition fed into container 22 by a chute or conveyor 26 and removable therefrom by a chute 28 positioned at the lower end of container 22. The upper end of cable 20 is vertically suspended from a yoke 30 which is carried by the piston rod 32 of a pneumatic cylinder or ram 34. Cylinder 34 is mounted at the upper portion of vessel 22 by enclosure hardware 36. A termination sleeve 38 is swaged or otherwise permanently secured to the upper end of cable 20 and has a threaded end 40 projecting upwardly coaxially with cable 20 through an opening 41 in yoke 30. A nut 42 is threaded onto sleeve end 40 and is secured thereto against rotation by a key 44. A thrust bearing 46, preferably a roller-type thrust bearing having axially opposed races, is positioned between nut 42 and the lower reach 48 of yoke 30 so as to permit free rotation of cable 20, sleeve 30 and nut 42 with respect to yoke 30. A pair of washers 50,52 are respectively sandwiched between nut 42 and the upper race of bearing 46, and between the lower race of bearing 46 and yoke reach 48.

A collar button 54 is swaged or otherwise permanently secured to cable 20 at a position therealong spaced from termination sleeve 38. Button 54 has a spherical head 56 encircling cable 20 at the end of button 54 remote from sleeve 38. A load cell 58 is affixed at the upper portion of material vessel 22 and has a foot 60 cantilevered therefrom. Foot 60 has a flat upper surface 62 facing in the direction of cable termination sleeve 38, with button 54 and spherical head 56 being positioned between termination sleeve 38 and foot 60. A circular opening 64 in foot 60 surrounds and encloses cable 20 as the latter extends therethrough into vessel 22. A washer 66 is freely slidably carried on foot surface 62 surrounding cable 20. That portion of cable 20 extending downwardly from head 56 is coated or otherwise enclosed with low friction material 67. As best seen in FIG. 5, the diameter of button head 56 is greater than the inside diameter of washer 66 or opening 64.

Control electronics 70 (FIG. 1) receives input signals from an operator keyboard 72 and from load cell 58, and provides output to an operator display 74 indicative of material level and other suitable information. Electronics 70 also provides a control output to an air supply 76 which includes suitable valves for supplying air to cylinder 34 for selectively raising and lowering piston rod 32, yoke 30 and cable 20.

In the normal position of the level indicating apparatus illustrated in FIGS. 1, 2 and 4, air supply 76 is controlled by electronics 70 to raise piston 32 and yoke 30 toward and into cylinder 34, so that the weight of cable 20 and the forces exerted thereon by material 24 are carried by cylinder 34. As material 24 is added to and-/or removed from vessel 22, varying tension on cable 20 tends to ravel and unravel the cable lays in the manner previously described. However, in accordance with a first important feature of the present invention, cable 20 is carried at yoke 30 by bearing 46, which permits free rotation of the cable with respect to the supporting yoke, so that raveling and unraveling of cable 20 due to varying tension thereon do not apply severe torsional sheer stresses to the cable mounting mechanism as in the prior art.

When a material level measurement is desired, either at periodic intervals programmed into control electronics 70 through keyboard 72 or by operator selection at keyboard 72, cylinder 34 is depressurized so as to lower piston 32 and yoke 30, and thereby slacken the upper end of cable 20. Downward travel of piston 32 and yoke 30 are designed to be such that head 56 of button 54 is brought into seating engagement with load cell foot 60, as illustrated in FIGS. 3 and 5, whereby the weight of slackened cable 20 which is unsupported by material 24 is carried and supported by load cell 58. The load cell output to control 70 thus indicates weight of the slackened portion of the cable, corresponding to ullage or head space between the upper surface of material 24 and load cell 58. Control electronics 70 is preprogrammed with the overall height of vessel 22 so that either or both material level and ullage can be displayed to the operator at display 74. In accordance with another important feature of the present invention best illustrated in FIG. 5, the spherical geometry of head 56 cooperates with washer 66 to isolate load cell foot 60 and load cell 58 from lateral forces applied to cable 20 by material 24, and from minor misalignment of rod 32 and foot opening 64. More particularly, the spherical geometry of head 56 renders head 56 self-aligning when seated on washer 66. Moreover, washer 66 is free to slide along surface 62 so as to be laterally self-aligning with respect to the axis of cable 20 as it passes through opening 64 in foot 60. This feature accommodates not only side loads on cable 20 but also tolerance variations in manufacture of the various apparatus components.

FIGS. 6–7 illustrate a modification to the preferred embodiment of the invention hereinabove described for providing electrical connection to cable 20. Such an electrical connection may be desirable, for example, in measuring temperature of cable 20 and of material 24 in contact therewith. Referring to FIGS. 6–7, the threaded end 80 of cable termination sleeve 38 is elongated as compared with end 40 of FIG. 4, and has the rotating section 82 of a slip ring assembly 84 affixed thereto by a nut 86. Cable-support yoke 88 is correspondingly elongated as compared with yoke 30 of FIGS. 1–3. A second section 90 of slip ring assembly 84 has a periphery best seen in FIG. 7 which slidably engages the side walls of yoke 88, and is thus held against rotation by the yoke side walls. Wires 92 (FIG. 7) provide electrical connection between control electronics 70 and slip ring assembly 84, and thus between the control electronics and cable 20. Slip ring assembly 84 may be of any suitable conventional type.

FIG. 8 illustrates a further modified embodiment of the invention wherein cable 20 is fixedly suspended within vessel 22 for indicating temperature of material 24, for example, or for indicating material level as a function of resistance or capacitance between cable 20 and the wall of vessel 24. A U-shaped mounting bracket 94 has a base 96 which supports bearing 46, washers 50,52 and nut 42 with respect to vessel 22. The side legs 98 of bracket 94 hold section 90 of slip ring assembly 84 against rotation. Slip ring assembly 84 is connected to suitable electronics 100 for indicating material condition in a manner otherwise known in the art.

It will thus be appreciated that the application discloses an improved cable suspension system, featuring thurst washer 46, for use in a wide variety of suspended-cable apparatus which employ laid wire cable for indicating condition of materials in a storage vessel. This suspension system overcomes the torsional sheer stress problem heretofore encountered in apparatus of this type due to raveling and unraveling of the cable lays caused by weight and drag of material thereon. The application also discloses a slackened cable seating arrangement, featuring spherical head 56 and washer 66, which helps isolate load cell 58 from side loads.

The invention claimed is:

1. Apparatus for indicating a preselected condition of material in a vessel comprising a laid wire cable, means vertically suspending said cable in said vessel so as to contact and be surrounded by material contained therein said means vertically suspending the cable including a sleeve affixed to the upper end of said cable, and means operatively coupled to said cable for indicating said preselected condition of material surrounding said cable, characterized in that said means vertically suspending said cable comprises thrust bearing means supporting an upper end of said cable, a screw thread extenior to the sleeve for vertical adjustment of said cable with respect to said thrust bearing means, and thereby absorbing weight of said cable and tension exerted on said cable by weight and drag of material surrounding said cable while permitting free rotation of said cable upper end as tension on said cable tends to unravel said cable.

2. The apparatus set forth in claim 1 wherein said thrust bearing means comprises a ball-type thrust bearing.

3. The apparatus set forth in claim 1 for indicating level of material in a vessel as a function of weight of said cable unsupported by material surrounding said cable, wherein said cable-suspending means comprises a yoke having said cable suspended therefrom, and means mounted at an upper portion of said vessel and coupled to said yoke for selectively lowering said yoke and thereby slackening said cable, wherein said condition-indicating means comprises weighing means mounted beneath said yoke for supporting said cable when slackened, and means responsive to said weight of said cable for indicating material level, and wherein said bearing means is carried by said yoke.

4. The apparatus set forth in claim 3 wherein said weighing means comprises a load cell mounted at said upper portion of said vessel and having means surrounding said cable, wherein said cable-suspending means includes means for engaging said cable-surrounding means on said load cell such that said cable is supported by said load cell, said means for engaging said cable-surrounding means including side thrust bearing means for absorbing lateral forces on said cable such that said load cell is responsive only to weight of said cable.

5. The apparatus set forth in claim 4 wherein said cable-surrounding means has a flat surface facing said yoke perpendicularly of said cable and an opening through said surface through which said cable extends, and wherein said side thrust bearing means comprises a washer slidably carried on said surface surrounding said cable.

6. The apparatus set forth in claim 5 wherein said side thrust bearing means further includes spherical means affixed to and surrounding said cable above said cable-surrounding means at a position to engage said washer, such that said cable and spherical means are self-centering in said washer.

7. The apparatus set forth in claim 1 wherein said cable-suspending means comprises means mounted in fixed position at an upper portion of said vessel.

8. The apparatus set forth in claim 1 further comprising slip ring means having one portion affixed to said cable and a second portion coupled against rotation to said cable-suspending means, said means operatively coupled to said cable including means electrically connected to said cable through said slip ring means.

9. Apparatus for indicating level of material in a vessel comprising a cable, means vertically suspending said cable in said vessel so as to contact and be surrounded by material contained therein, said cable-suspending means including means for selectively introducing slack in said cable, weighing means and means coupling said cable to said weighing means when said cable is slackened such that a slackened portion of said cable is supported by said weighing means, and means responsive to said weighing means for indicating level of material in said vessel as a function of weight of said slackened portion of said cable, said cable suspending means including thrust bearing means supporting the upper end of said cable, said means vertically to suppending the cable including a sleeve affixed to the upper end of said cable, a screw thread exterior to said sleeve for vertical adjustment of said cable with respect to said thrust bearing means characterized in that said means coupling said cable to said weighing means includes side-thrust bearing means for absorbing lateral forces on said cable such that said weighing means is responsive only to weight of said cable.

10. The apparatus set forth in claim 9 wherein said cable-coupling means includes means surrounding said cable having a flat surface facing said slack-introducing means perpendicularly of said cable with an opening through which said cable extends, and wherein said side-thrust bearing means comprises a washer slidably carried on said surface surrounding said cable.

11. The apparatus set forth in claim 11 wherein said side-thrust bearing means further includes spherical means affixed to and surrounding said cable above said cable-surrounding means at a position to engage said washer, such that said cable and spherical means are self-centering in said washer.

* * * * *